United States Patent
Liu et al.

(10) Patent No.: US 11,954,842 B2
(45) Date of Patent: Apr. 9, 2024

(54) POWDER LEAKAGE MONITORING DEVICE AND POWDER LEAKAGE MONITORING METHOD

(71) Applicant: Huaneng Nanjing Jinling Power Generation Co., Ltd., Jiangsu (CN)

(72) Inventors: Yudong Liu, Jiangsu (CN); Lei Wang, Jiangsu (CN); Kai Shi, Jiangsu (CN); Yong Xia, Jiangsu (CN); Xudong Si, Jiangsu (CN); Dongfang Li, Jiangsu (CN); Xuedong Liang, Jiangsu (CN)

(73) Assignee: HUANENG NANJING JINLING POWER GENERATION CO., LTD., Nanjing (CN)

( * ) Notice: Subject to any disclaimer, the term of this patent is extended or adjusted under 35 U.S.C. 154(b) by 0 days.

(21) Appl. No.: 17/978,190

(22) Filed: Oct. 31, 2022

(65) Prior Publication Data
US 2023/0069945 A1 Mar. 9, 2023

Related U.S. Application Data

(63) Continuation of application No. PCT/CN2022/081331, filed on Mar. 17, 2022.

(30) Foreign Application Priority Data

Sep. 6, 2021 (CN) .......................... 202111035753.2

(51) Int. Cl.
*G06T 7/00* (2017.01)
*G06N 3/02* (2006.01)
(Continued)

(52) U.S. Cl.
CPC ............. *G06T 7/0004* (2013.01); *G06N 3/02* (2013.01); *G06T 3/40* (2013.01); *G06T 7/50* (2017.01);
(Continued)

(58) Field of Classification Search
None
See application file for complete search history.

(56) References Cited

U.S. PATENT DOCUMENTS

2020/0368826 A1 * 11/2020 Zhang .................. B23Q 15/013
2021/0010645 A1 *  1/2021 Zhang .................. G01K 11/322
(Continued)

FOREIGN PATENT DOCUMENTS

CN          201583128 U    9/2010
CN          112767302 A    5/2021
WO    WO-2014194194 A1 * 12/2014 ........... A61N 5/1071

*Primary Examiner* — Tyler W. Sullivan

(57) ABSTRACT

The invention discloses a powder leakage monitoring device and a powder leakage monitoring method. The powder leakage monitoring device comprises light field camera, 3D PTZ (3-Dimensional Pan/Tilt/Zoom) and computer. Wherein, the light field camera records original light field images of monitored area; the 3D PTZ under the light field camera adjusts the shooting angle of the light field camera when it rotates according to the set direction; and the computer respectively connects to the light field camera and the 3D PTZ, which generates refocused images corresponding to the original light field images, and determines the spatial coordinates of the powder leakage point and the hazard range of the powder leakage in the monitored area according to the refocused images and the shooting angle. Therefore, the range and accuracy of powder leakage monitoring are both increased by using this invention.

4 Claims, 5 Drawing Sheets

(51) Int. Cl.
*G06T 3/40* (2006.01)
*G06T 7/50* (2017.01)
*G06T 7/557* (2017.01)
*G06T 7/571* (2017.01)
*G06T 7/60* (2017.01)
*G06T 7/70* (2017.01)
*G06T 7/80* (2017.01)
*G06V 10/82* (2022.01)
*G06V 30/18* (2022.01)
*H04N 23/50* (2023.01)
*H04N 23/695* (2023.01)

(52) U.S. Cl.
CPC .............. *G06T 7/557* (2017.01); *G06T 7/571* (2017.01); *G06T 7/60* (2013.01); *G06T 7/70* (2017.01); *G06T 7/80* (2017.01); *G06V 10/82* (2022.01); *G06V 30/18124* (2022.01); *H04N 23/50* (2023.01); *H04N 23/695* (2023.01); *G06T 2207/10052* (2013.01); *G06T 2207/10148* (2013.01); *G06T 2207/20081* (2013.01); *G06T 2207/20084* (2013.01); *G06T 2207/30108* (2013.01); *G06T 2207/30232* (2013.01)

(56) References Cited

U.S. PATENT DOCUMENTS

| | | | |
|---|---|---|---|
| 2022/0168840 A1* | 6/2022 | Engel | B33Y 10/00 |
| 2022/0172380 A1* | 6/2022 | Lee | H04N 23/531 |
| 2023/0024872 A1* | 1/2023 | Manautou | G06V 10/60 |

* cited by examiner

POWDER LEAKAGE MONITORING DEVICE AND POWDER LEAKAGE MONITORING METHOD

TECHNICAL FIELD

The invention relates to the technical field of light field imaging, particularly to a powder leakage monitoring device and a powder leakage monitoring method.

BACKGROUND ART

The powder is an important application form of solid materials in industrial processes, such as polyethylene powder, cement powder, pulverized coal, etc. The industrial powder is usually transported by pneumatic conveying (using high-pressure air) through the air powder pipeline. The pneumatic conveying pipeline is prone to wear, resulting in powder leakage, environmental pollution, fire and explosion. These results seriously endanger the environment and production safety. Therefore, the powder leakage monitoring of the pneumatic conveying pipeline is of great significance.

At present, laser scattering technology and image recognition technology are mainly used for monitoring powder leakage. However, due to the limitation of monitoring range, the laser scattering technology can only monitor the straight pipe section within a certain distance, and can not locate the leakage point. Besides, the monitoring accuracy of the image recognition technology is low because it is affected if the lens is dirty. Therefore, at present, powder leakage is still mainly monitored through on-site inspection by personnel, and the above monitoring technologies are only used as supplementary reference. In fact, the distribution of pipelines is complex in the 3D space, which normally includes long-distance layout and many corners. To realize the whole process monitoring of powder leakage, the air powder pipeline shall be fully covered and the leakage position shall be located at the same time.

Therefore, it is an urgent technical issue to increase the monitoring range and to improve the monitoring accuracy of powder leakage.

SUMMARY OF THE INVENTION

The invention provides a powder leakage monitoring device to solve the technical issues of small powder leakage monitoring range and low accuracy in the prior art.

The device comprises:
a light field camera for recording the original light field images of the monitored area;
a 3D PTZ (3-Dimensional Pan/Tilt/Zoom) arranged under the light field camera and for adjusting the shooting angle of the light field camera when it rotates according to the set direction so as to align the light field camera with the monitored area;
and a computer respectively connected with the light field camera and the 3D PTZ to (a) generate the light field refocused images, (b) determine the spatial coordinates and the hazard range of the powder leakage in the monitored area according to the light field refocused images and the shooting angle.

In some embodiments of the invention, the light field camera comprises:
a main lens for focusing and instantly imaging the photographed scene or object;
a microlens array composed of microlenses in an array. The focal length and aperture of each microlens are the same, and the optical axes of the microlenses are parallel to each other;
and an image sensor for detecting incident light, photoelectric conversion and forming a digital image signal, and recording the original light field images modulated by the main lens and microlens array.

Wherein, the optical axes of the main lens, the microlens array and the image sensor coincide, the microlens array is located at the image plane of the main lens, and the image sensor is located at one focal length behind the microlens array.

In some embodiments of the invention, the shooting angle includes a pitch angle and a circumferential angle, and the rotation center of the 3D PTZ in the pitch direction and circumferential direction passes through the center of the microlens array.

In some embodiments of the invention, the spatial coordinates are the 3D coordinates in the right-hand coordinate system. The right-hand coordinate system is established by taking the center of the image sensor as the origin and the optical axis direction as the X-axis.

In some embodiments of the invention, the light field camera is provided with a dust-proof sheath, and a vibration isolation support is arranged at the lower part of the 3D PTZ.

Correspondingly, the invention also provides a powder leakage monitoring method, which is applied to the powder leakage monitoring device. The method comprises the following steps:

The computer obtains the original light field images of the monitored area collected by the light field camera according to the preset cycle, and generates a set of refocused images focused on different depth positions by saving and decoding the original light field images;

The computer detects the refocused images based on the preset convolution neural network model and preliminarily judges whether there is any powder leakage, if yes, the computer determines the target refocused image focused on the powder leakage point in each refocused image according to the definition evaluation function;

The computer determines the target depth position of the powder leakage point according to the refocusing parameter of the target refocused image and the preset fitting curve;

The computer finally judges powder leakage according to the target depth position and the shooting angle of the light field camera obtained from the 3D PTZ;

Wherein, the depth position is projected by the image focusing position on the optical axis of the light field camera, and the preset fitting curve is determined by the corresponding relationship between the refocusing parameter of the refocused image and each depth position.

In some embodiments of the invention, the computer finally judges powder leakage according to the target depth position and the shooting angle of the light field camera obtained from the 3D PTZ as follows:

the computer determines the spatial coordinates of the powder leakage point according to the target depth position and the shooting angle;

if the depth distance corresponding to the target depth position is within the preset distance range and the spatial coordinates is within the preset coordinate range, the computer determines powder leakage as the final result;

wherein, the depth distance is the straight-line distance between the depth position and the image sensor of the light field camera.

In some embodiments of the invention, after the computer determines powder leakage as the final result, the method further comprises:

the computer determines the hazard range of powder leakage according to the area of powder smoke in the target refocused image and the image magnification, and then the computer sends an alarm and reports the spatial coordinates and the hazard range. The hazard range includes the length, height and projection area of the powder smoke.

In some embodiments of the invention, before the computer obtains the original light field images of the monitored area collected by the light field camera according to the preset cycle, the method further comprises:

the computer adjusts the 3D PTZ to align the light field camera with the monitored area;

the computer determines the preset fitting curve according to the results of the calibration experiment of the refocusing depth position;

wherein, the calibration experiment of the refocusing depth position is as follows:

the calibration plate is placed perpendicular to the main optical axis of the light field camera, and the distance $d_0$ from the plane of the calibration plate to the front end face of the main lens of the light field camera is accurately measured;

the calibration plate is photographed using the light field camera, the refocusing parameter s is traversed, and a set of refocused images are obtained;

the definition of each refocused image is determined by using the image definition evaluation function, so that the refocusing parameter s corresponding to the image with the highest definition corresponds to $d_0$, and the calibration plate position corresponding to the clear image when s=0 is defined as the depth position d=0 mm;

The value of $d_0$ is changed and the experiment is repeated to obtain the corresponding relationship between the refocusing parameter and the depth position, which is expressed as d=f(s).

In some embodiments of the invention, the training samples of the convolutional neural network comprise leakage condition image samples, non-leakage condition image samples and main lens dirt samples.

When the above technical scheme is applied in the powder leakage monitoring device, the computer obtains the original light field images of the monitored area collected by the light field camera according to the preset cycle, and then the computer generates a set of refocused images focused on different depth positions by saving and decoding the original light field images; the computer detects the refocused images based on the preset convolution neural network model and preliminarily judges whether there is any powder leakage, if yes, the computer determines the target refocused image focused on the powder leakage point in each refocused image according to the definition evaluation function; the computer determines the target depth position of the powder leakage point according to the refocusing parameter of the target refocused image and the preset fitting curve; and the computer finally judges powder leakage according to the target depth position and the shooting angle of the light field camera obtained from the 3D PTZ. Wherein, the depth position is projected by the image focusing position on the optical axis of the light field camera, and the preset fitting curve is determined by the corresponding relationship between the refocusing parameter of the refocused image and each depth position. Therefore, the range and accuracy of powder leakage monitoring are both increased by using this invention.

FIGURES

The figures for the embodiments of the invention are introduced in the following for a clearer description of the technical scheme, but they only describe some embodiments of the invention. Those skilled in the art can also obtain other figures according to these figures without any creative work.

Figure 1:
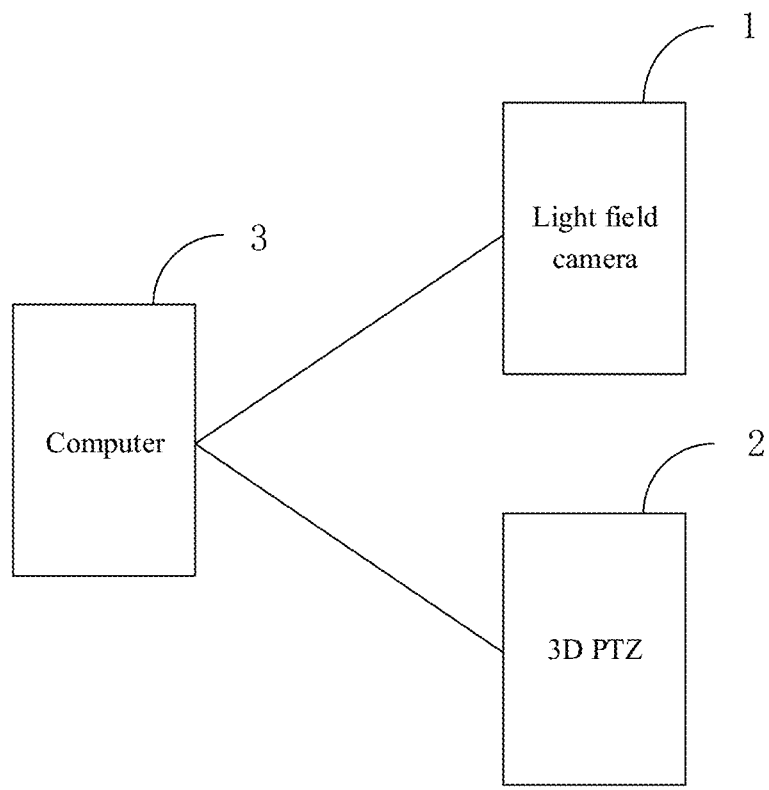
FIG. 1 shows the structure of the powder leakage monitoring device provided by the embodiment of the invention.
Figure 2:
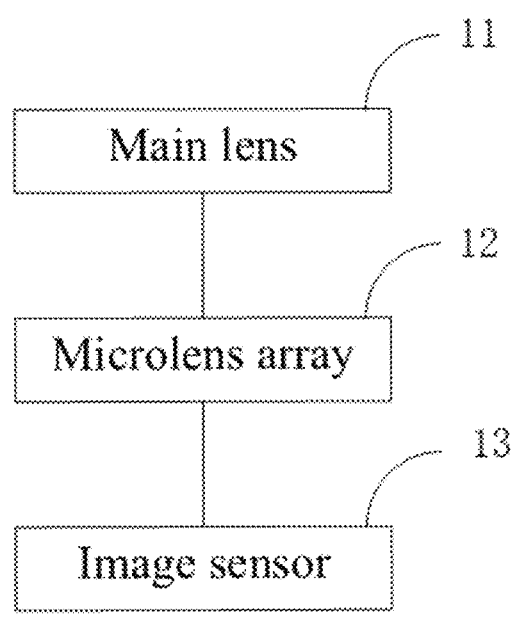
FIG. 2 shows the structure of the light field camera in the embodiment of the invention.

In FIG. 1 and FIG. 2, 1. light field camera; 2. 3D PTZ; 3. computer; 11. main lens; 12. microlens array; 13. image sensor.

DETAILED DESCRIPTION OF PREFERRED EMBODIMENTS

The figures for the embodiments of the invention in the following clearly and comprehensively describe the technical scheme in the embodiments of the invention. Obviously, those embodiments are not all the embodiments of the invention. All other embodiments obtained by ordinary technicians in the art without any creative work shall belong to the scope of protection of the invention.

The embodiment of the invention provides a powder leakage monitoring device, as shown in FIG. 1. The device comprises:

a light field camera 1 for recording the original light field images of the monitored area;

a 3D PTZ 2 under the light field camera 1 for adjusting the shooting angle of the light field camera 1 when it rotates according to the set direction to align the light field camera 1 with the monitored area;

and a computer 3 respectively connected with the light field camera 1 and the 3D PTZ, which generates refocused images corresponding to the original light field images, and determines the spatial coordinates of the powder leakage point and the hazard range of the powder leakage in the monitored area according to the refocused images and the shooting angle.

In the embodiment, the light field camera 1 can both record the intensity information of the light in the light field, and the direction information of the light in the light field. The monitored area can be the one where there is an air powder pipeline that transports industrial powder by pneumatic conveying. The air powder pipeline may extend and bend in any direction in the space. The 3D PTZ 2 can adjust the shooting angle by rotating the light field camera 1, and can rotate in different directions to align the light field camera 1 with the monitored area, which expands the monitored range.

The computer 3 is connected with the light field camera 1 and the 3D PTZ 2 through the corresponding communication interface. An image acquisition card is built in the computer 3 to get the original light field images from the light field camera 1 through two Camera Link data transmission lines. In addition, the image acquisition card saves the original image signal of the light field, decodes the light field information, refocuses the light field, and obtains the refocused images. The spatial coordinates of the powder leakage point in the monitored area and the hazard range of the powder leakage can be determined according to the refocused images and the shooting angle obtained from the 3D PTZ 2.

To reliably obtain the original light field images, in some embodiments of the invention, as shown in FIG. 2, the light field camera 1 comprises:

a main lens 11 for focusing and instantly imaging the photographed scene or object;

a microlens array 12 composed of microlenses in an array. The focal length and aperture of each microlens are the same, and the optical axes of the microlenses are parallel to each other;

and an image sensor 13 for detecting incident light, photoelectric conversion and forming a digital image signal, and recording the original light field images modulated by the main lens 11 and microlens array 12;

wherein, the optical axes of the main lens 11, the microlens array 12 and the image sensor 13 coincide, the microlens array 12 is located at the image plane of the main lens 11, and the image sensor 13 is located at one focal length behind the microlens array 12.

In the embodiment, the main lens 11 has an aperture structure for limiting the incident angle and luminous flux of the light emitted by each object point into the imaging system. The microlenses are generally arranged in the same plane, thus, the microlens array 12 is flat.

To reliably adjust the shooting angle of the light field camera 1, in some embodiments of the invention, the shooting angle includes the pitch angle and the circumferential angle. The rotation center of the 3D PTZ 2 in the pitch direction and the circumferential direction passes through the center of the microlens array 12, which expands the powder leakage monitoring range.

In this embodiment, the 3D PTZ 2 is closely matched with the light field camera 1, and the rotation center of the 3D PTZ 2 in the pitch direction and circumferential direction passes through the center of the microlens array 12, so as to ensure the accuracy of position measurement.

In order to accurately locate the powder leakage point, in some embodiments of the invention, the spatial coordinates are the 3D coordinates in the right-hand coordinate system. The right-hand coordinate system is established by taking the center of the image sensor 13 as the origin and the optical axis direction as the X-axis.

Specifically, the right-hand coordinate system is one of the methods to specify the rectangular coordinate system in space. The positive directions of the X-axis, Y-axis, and Z-axis in this coordinate system are as follows: put the right hand at the origin, make the thumb, index finger and middle finger at right angles to each other, point the thumb to the positive direction of X-axis, and when the index finger points to the positive direction of Y-axis, the direction pointed by the middle finger is the positive direction of Z-axis.

In order to improve the reliability of the device, in some embodiments of the invention, the light field camera 1 is provided with a dust-proof sheath, and the lower part of the 3D PTZ 2 is provided with a vibration isolation support.

The powder content around the monitored area is high in the powder leakage situation, thus, in order to ensure the reliability of the light field camera 1 in the embodiment, a dust-proof sheath is arranged on the light field camera 1. A vibration isolation support is arranged at the lower part of the 3D PTZ 2 so as to block the spreading of environmental vibration to the light field camera 1 and prevent the vibration from affecting the component position and image definition of the light field camera 1. Therefore, in the industrial environment with significant vibration, the light field camera 1 has a more stable operating condition. The vibration isolation support can be installed on a specific foundation.

With the above technical scheme, the powder leakage monitoring device comprises a light field camera, a 3D PTZ and a computer, wherein, the light field camera records the original light field images of the monitored area, the 3D PTZ under the light field camera adjusts the shooting angle of the light field camera when it rotates according to the set direction, and the computer respectively connects to the light field camera and the 3D PTZ to generate refocused images corresponding to the original light field images, and determines the spatial coordinates of the powder leakage point and the hazard range of the powder leakage in the monitored area according to the refocused images and the shooting angle. Therefore, the range and accuracy of powder leakage monitoring are both increased by using this invention.

Figure 3:
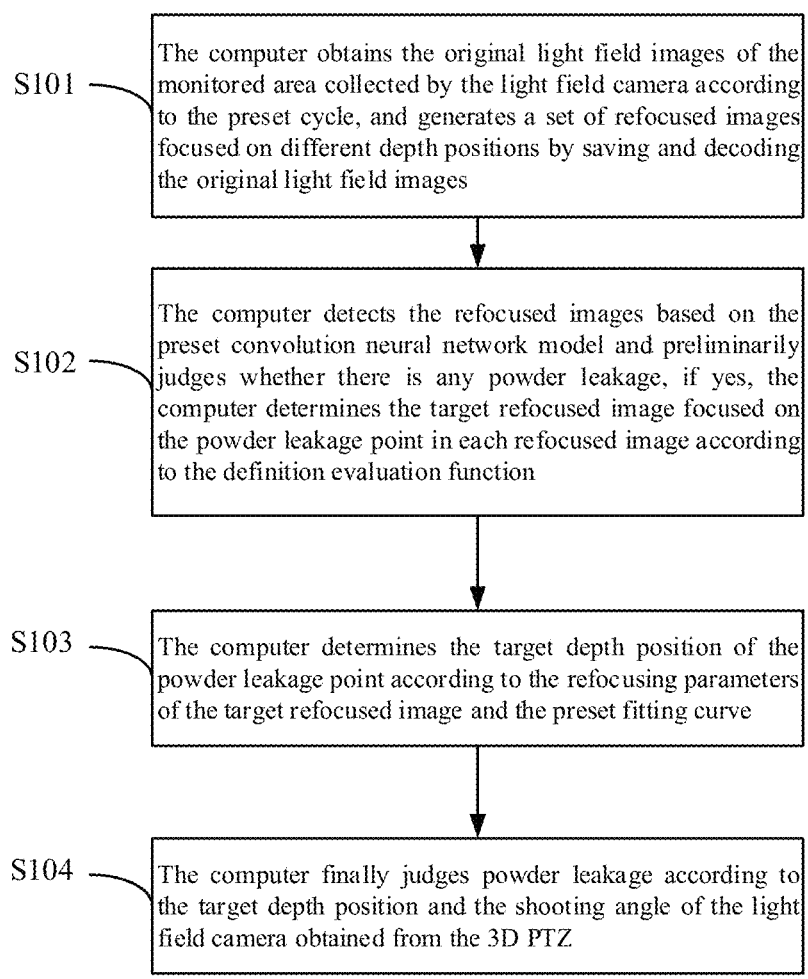
FIG. 3 shows the flow of the powder leakage monitoring method provided by the embodiment of the invention.

The embodiment of the invention also provides a powder leakage monitoring method, which is applied to the powder leakage monitoring device described above, as shown in FIG. 3. The method comprises:

Step S101, the computer obtains the original light field images of the monitored area collected by the light field camera according to the preset cycle, and generates a set of refocused images focused on different depth positions by saving and decoding the original light field images;

In the embodiment, the light field camera collects the original light field images of the monitored area according to the preset cycle which can be 1 minute. After obtaining the original light field images from the light field camera, the computer saves and decodes the original light field images to generate a set of refocused images focused on different depth positions. The depth position is projected by the image focus position on the optical axis of the light field camera.

Step S102, the computer detects the refocused images based on the preset convolution neural network model and preliminarily judges whether there is any leakage, if yes, the computer determines the target refocused image focused on the powder leakage point in each refocused image according to the definition evaluation function.

In the embodiment, a preset convolutional neural network model is set in the computer, and the computer detects the refocused images based on the preset convolutional neural network model, and preliminarily judges whether there is any powder leakage. The preliminary judgment result can be the probability of powder leakage. Generally, the judgment result is a number in the range of 0 to 1, wherein, 0 indicates that the probability of leakage is 0%, and 1 indicates that the probability of leakage is 100%. Setting a threshold for the probability can preliminarily judge whether powder leakage occurs.

If powder leakage is preliminarily judged, the computer determines the definition of each refocused image according to the definition evaluation function and also determines the target refocused image focused on the powder leakage point in each refocused image. It can be understood that the definition of the powder leakage point in the target refocused image is the highest. The definition evaluation function includes the gray gradient function, the informatics function, the frequency domain function and the statistical function, which can be flexibly selected by those skilled in the art according to actual needs.

In order to improve the accuracy of the preliminary judgment result, in some embodiments of the invention, the training samples of the convolutional neural network comprise leakage condition image samples, non-leakage condition image samples and main lens dirt samples.

In the embodiment, the leakage condition image samples and non-leakage condition image samples are for the convolution neural network training, and some image samples of the dirty main lens are selected for training so as to improve the robustness of the convolution neural network.

Step S103, the computer determines the target depth position of the powder leakage point according to the refocusing parameter of the target refocused image and the preset fitting curve.

The refocusing makes the images with different depths clear by changing the imaging detection surface. The refocusing parameter characterizes the relationship between the refocusing surface and the original light field images. In the embodiment, the refocusing parameter of the target refocused image can be obtained through the refocusing program, and the preset fitting curve is determined by the corresponding relationship between the refocusing parameter of the refocused image and each depth position. The computer can determine the target depth position of the powder leakage point according to the refocusing parameter of the target refocused image and the preset fitting curve. It can be understood that the target depth position is projected by the powder leakage point on the optical axis of the light field camera.

In order to improve monitoring accuracy, in some embodiments of the invention, before the computer obtains the original light field images of the monitored area collected by the light field camera according to the preset cycle, the method further comprises:

the computer adjusts the 3D PTZ to align the light field camera with the monitored area;

the computer determines the preset fitting curve according to the results of the calibration experiment of the refocusing depth position;

wherein, the calibration experiment of the refocusing depth position is as follows:

the computer determines the preset fitting curve according to the results of the calibration experiment of the refocusing depth position;

wherein, the calibration experiment of the refocusing depth position is as follows:

the calibration plate is placed perpendicular to the main optical axis of the light field camera, and the distance $d_0$ from the plane of the calibration plate to the front end face of the main lens of the light field camera is accurately measured;

the calibration plate is photographed using the light field camera, the refocusing parameter s is traversed, and a set of refocused images are obtained;

the definition of each refocused image is determined by using the image definition evaluation function, so that the refocusing parameter s corresponding to the image with the highest definition corresponds to $d_0$, and the calibration plate position corresponding to the clear image when s=0 is defined as the depth position d=0 mm;

The value of $d_0$ is changed and the experiment is repeated to obtain the corresponding relationship between the refocusing parameter and the depth position, which is expressed as d=f(s).

In the embodiment, after the powder leakage monitoring device is installed, the computer adjusts the 3D PTZ to align the light field camera with the monitored area. Since the computer needs to determine the refocusing position of the light field refocused image according to the depth position of the powder leakage image, it is necessary to conduct the refocusing depth position calibration experiment first and then determine the preset fitting curve according to the experimental results.

Figure 4:
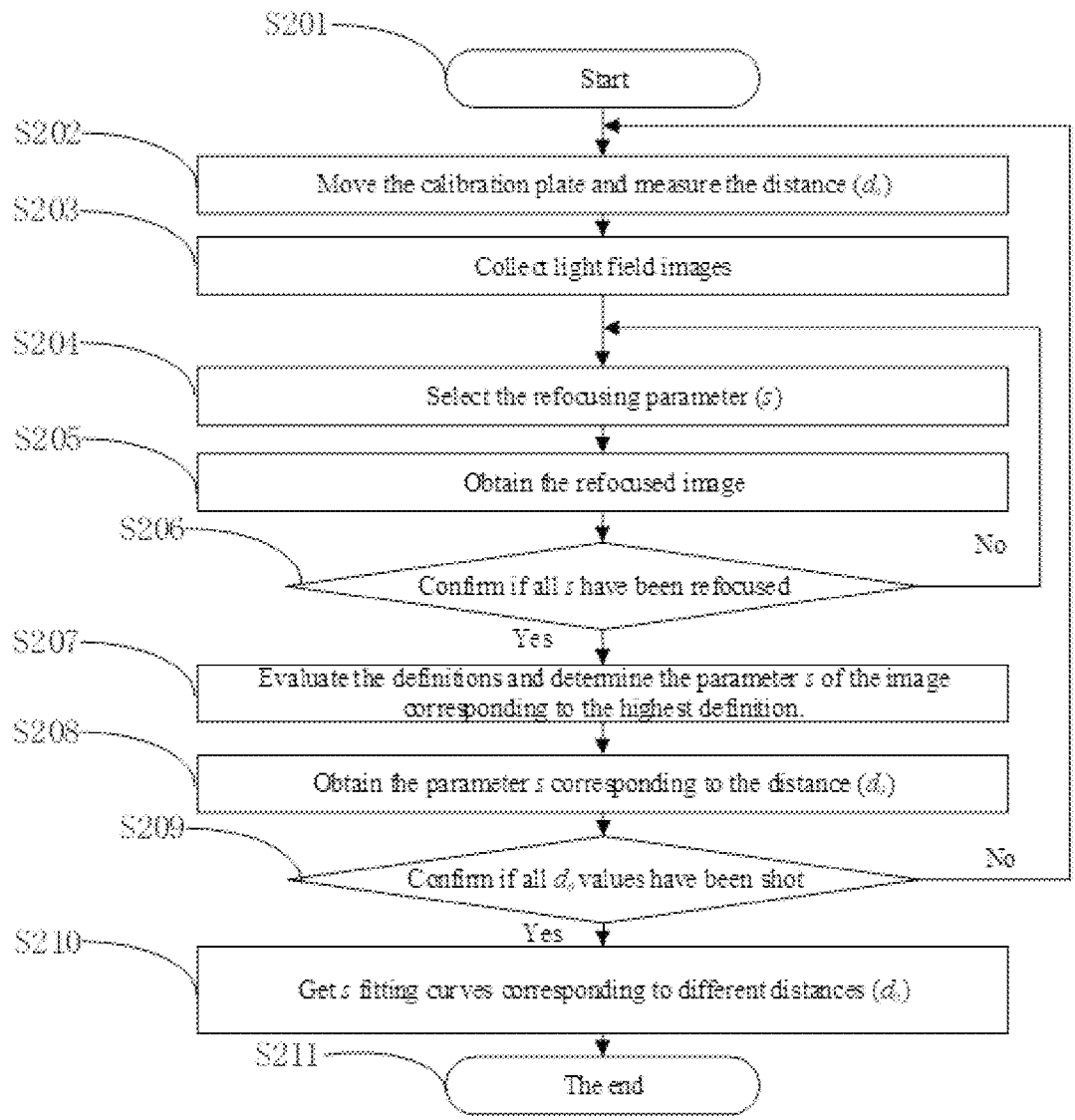
FIG. 4 shows the flow of the calibration experiment of the refocusing depth position in the embodiment of the invention.

In the specific application scenario of the invention, as shown in FIG. 4, the refocusing depth position calibration experiment specifically comprises the following steps:

Step S201, start.

Step S202, move the calibration plate and measure the distance ($d_0$).

Figure 6:
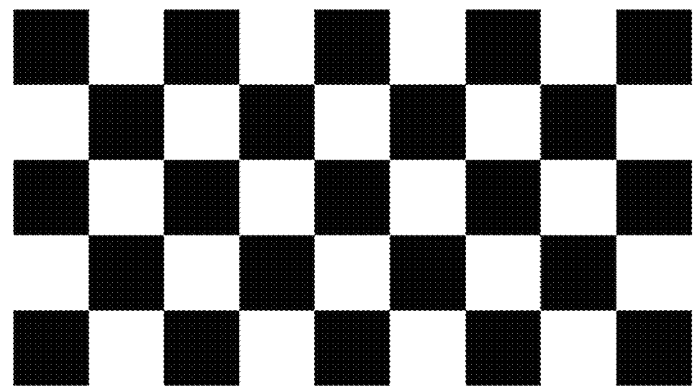
FIG. 6 shows the checkerboard calibration plate in the embodiment of the invention.

The calibration board can be a black-and-white checkerboard calibration board, as shown in FIG. 6. The calibration plate is placed perpendicular to the main optical axis of the light field camera, and the distance $d_0$ between the plane of the calibration plate and the front end face of the main lens of the light field camera is accurately measured.

Step S203, collect light field images.

In this step, the light field camera is used to shoot the calibration plate and collect the light field images.

Step S204, select the refocusing parameter (s).

Step S205, obtain the refocused image.

Step S206, confirm if all s have been focused, if yes, execute step S207; if not, execute step S204.

Figure 5:
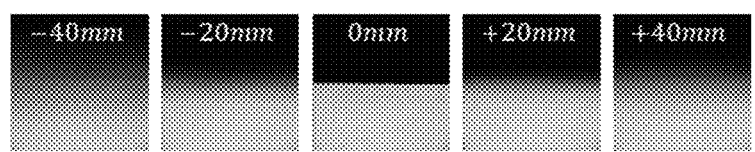
FIG. 5 shows a set of refocused images focused on different depth positions in the embodiment of the invention.

Traverse the refocusing parameter s and obtain a set of refocusing images, as shown in FIG. 5. The black-and-white boundary in the figure is a locally enlarged view of the black-and-white block boundary in the checkerboard calibration plate, and the number in the figure is the depth position.

Step S207, evaluate the definition to determine the parameter s of the image with the highest definition.

The definition of each refocused image is determined by using the image definition evaluation function, and the refocusing parameter of the image with the highest definition is determined.

Step S208, obtain the parameter s corresponding to the distance ($d_0$).

Make the refocusing parameter s corresponding to the image with the highest definition correspond to $d_0$, wherein, the calibration plate position corresponding to the clear image when s=0 is defined as the depth position d=0 mm. In the embodiment, when d=0 mm, the distance $d_0$ from the calibration plate to the front end face of the main lens of the light field camera is 110 mm.

Step S209, confirm if all $d_0$ values are photographed, if yes, execute Step S210, if not, execute Step S202.

Step S210, obtain the s fitting curves corresponding to different distances ($d_0$).

The value of $d_0$ is changed and the experiment is repeated to obtain the corresponding relationship between the refocusing parameter and the depth position, which is expressed as d=f(s).

Step S211, the end.

Step S104, the computer finally judges powder leakage according to the target depth position and the shooting angle of the light field camera obtained from the 3D PTZ;

In the embodiment, in view of the characteristics of harsh environment and large accumulation of powder on the project site, after preliminarily judging the power leakage, it is necessary to make a secondary judgment in combination with the target depth position of powder leakage, so as to further eliminate the misjudgment caused by dust, dirt or foreign matter shielding on the lens surface of the light field camera. The final judgment result of powder leakage can be determined according to the target depth position and shooting angle.

In order to improve the monitoring accuracy of powder leakage, in some embodiments of the invention, the computer finally judges powder leakage according to the target depth position and the shooting angle of the light field camera obtained from the 3D PTZ as follows:

the computer determines the spatial coordinates of the powder leakage point according to the target depth position and the shooting angle;

if the depth distance corresponding to the target depth position is within the preset distance range and the spatial coordinates is within the preset coordinate range, the computer determines powder leakage as the final result;

In the embodiment, the 3D PTZ can rotate in the pitch direction and circumferential direction. The angular coordinates of the pitch angle and circumference angle can be determined according to the shooting angle. The spatial coordinates of the powder leakage point can be determined according to the target depth position and angular coordinates. The spatial coordinates are the 3D coordinates in the right-hand coordinate system. The right-hand coordinate system is established by taking the center of the image sensor as the origin and the optical axis direction as the X-axis. If the depth distance corresponding to the target depth position is within the preset distance range, it indicates that the misjudgment is not caused by the dirt of the main lens. At this time, if the range of spatial coordinates is within the preset coordinate range, it indicates that there is powder leakage, and then the computer finally judges powder leakage. The depth distance is the straight-line distance from the depth position to the image sensor of the light field camera.

In order to enable the operation and maintenance personnel to deal with the powder leakage in time and prevent the further expansion of the leakage, in some embodiments of the invention, the method further comprises the following after the computer determines powder leakage as the final result:

the computer determines the hazard range of powder leakage according to the area of powder smoke in the target refocused image and the image magnification, and then the computer sends an alarm and reports the spatial coordinates and the hazard range. The hazard range includes the length, height and projection area of the powder smoke, which provides sufficient monitoring information to the operation and maintenance personnel.

When the above technical scheme is applied in the powder leakage monitoring device, the computer obtains the original light field images of the monitored area collected by the light field camera according to the preset cycle, and then the computer generates a set of refocused images focused on different depth positions by saving and decoding the original light field images; the computer detects the refocused images based on the preset convolution neural network model and preliminarily judges whether there is any powder leakage, if yes, the computer determines the target refocused image focused on the powder leakage point in each refocused image according to the definition evaluation function; the computer determines the target depth position of the powder leakage point according to the refocusing parameter of the target refocused image and the preset fitting curve; and the computer finally judges powder leakage according to the target depth position and the shooting angle of the light field camera obtained from the 3D PTZ. Wherein, the depth position is projected by the image focusing position on the optical axis of the light field camera, and the preset fitting curve is determined by the corresponding relationship between the refocusing parameter of the refocused image and each depth position. Therefore, the range and accuracy of powder leakage monitoring are both increased by using this invention.

The technical scheme of the invention is described in combination with specific application scenarios in order to further expound the technical idea of the invention.

Figure 7:
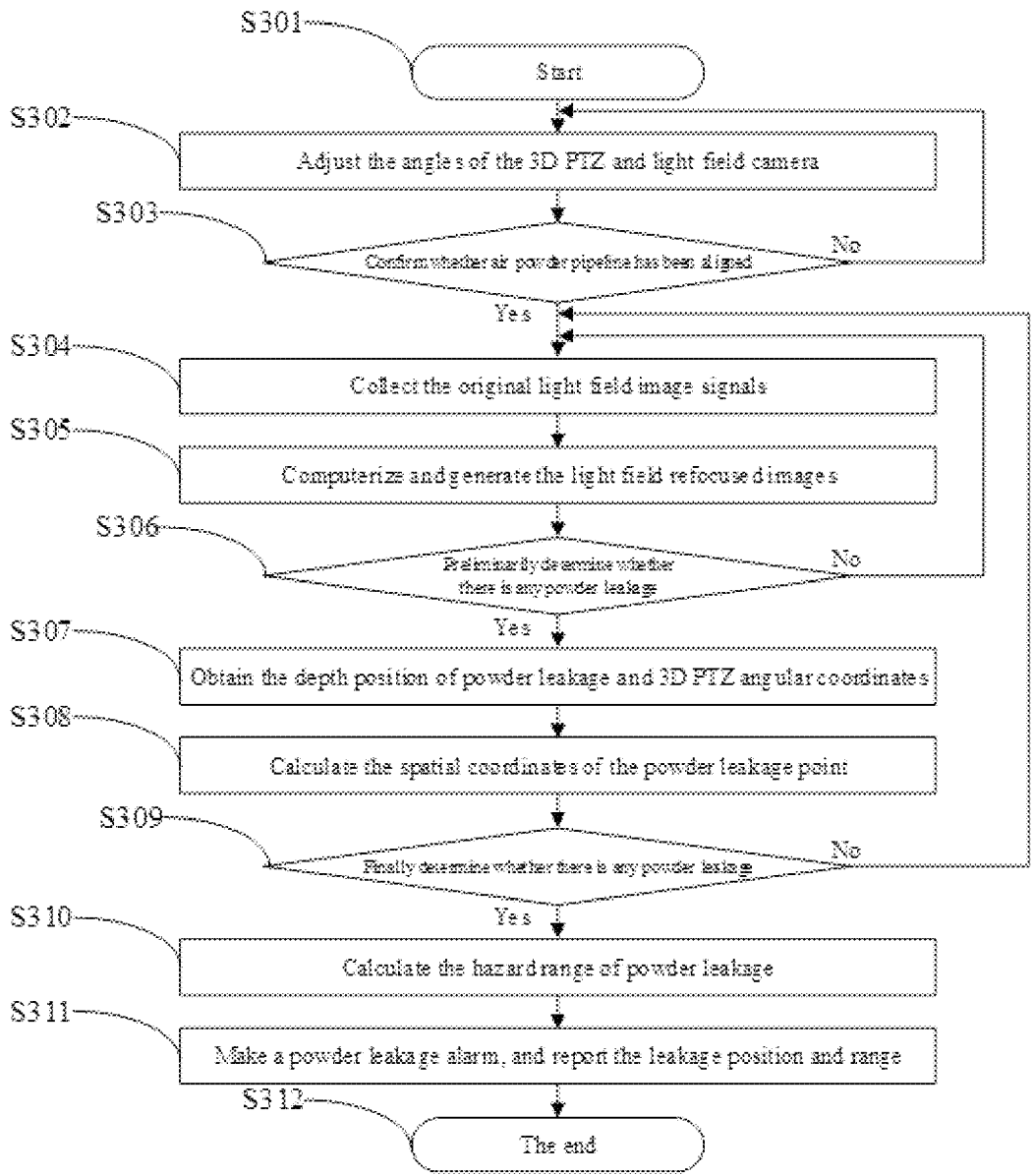
FIG. 7 shows the flow of the powder leakage monitoring method provided in another embodiment of the invention.

The embodiment of the invention provides a powder leakage monitoring method, which is applied to the powder leakage monitoring device described above. As shown in FIG. 7, the method comprises the following steps:

Step S301, start.

Complete system assembly, communication and control mechanism commissioning, and equipment initialization.

Step S302, adjust the angles of the 3D PTZ and light field camera.

In this step, the 3D PTZ is adjusted to align the light field camera with the air powder pipeline to be monitored, and the refocusing depth position calibration experiment is completed based on Steps S201 to S211.

Step S303, confirm whether air powder pipeline has been aligned, if yes, execute Step S304, if not, execute Step S302.

Judge whether the light field camera is aligned with the air powder pipeline in this step.

Step S304, collect the original light field image signals.

Start monitoring and collecting the original light field image once every minute in this step.

Step S305, computerize and generate the light field refocused images.

Specifically, the computer is used to save and decode the original light field images, and generate a set of light field refocused images focused on different depth positions.

Step S306, preliminarily determine whether there is any powder leakage, if yes, execute Step S307, if not, execute Step S304.

In this step, the refocused images are detected based on the convolutional neural network to preliminarily judge whether there is any powder leakage.

Step S307, obtain the depth position of powder leakage and 3D PTZ angular coordinates.

Specifically, the angular coordinates include pitch angle and circumference angle.

Step S308, calculate the spatial coordinates of the powder leakage point.

Specifically, the spatial coordinates of the powder leakage point are calculated according to the depth position of the powder leakage point and the angular coordinate signal of the 3D PTZ.

Step S309, finally determine whether there is any powder leakage. If yes, execute Step S310, if not, execute Step S304.

Step S310, calculate the hazard range of powder leakage.

Specifically, focus on the refocused images of the smoke position of powder leakage, identify the area of powder smoke in the image, and calculate the length, height and projection area of the powder smoke hazard in combination with the image magnification corresponding to the refocused images.

Step S311, make a powder leakage alarm, and report the leakage position and range.

Step S312, the end.

At last, it shall be noted that the above embodiments are only used to illustrate but not limit the technical scheme of the invention. Although the invention has been described in detail with reference to the above embodiments, those skilled in the art shall understand that they can still modify the technical scheme recorded in the above embodiments or replace some of the technical features equally. These modifications or replacements do not drive the essence of the corresponding technical scheme away from the spirit and scope of the technical scheme of the embodiments of the invention.

The invention claimed is:

1. A powder leakage monitoring device, characterized by comprising:
    light field camera, used to record original light field image of monitored area;
    3D PTZ (3-Dimensional Pan/Tilt/Zoom), arranged under the light field camera, is used to rotate in a set direction to adjust a shooting angle of the light field camera, so that the light field camera is aligned with the monitored area;
    computer, respectively connected to the light field camera and the 3D PTZ, is used to generate a refocused image corresponding to the original light field image, and determine spatial coordinates of pneumatic conveying dust leakage point in the monitored area and the hazard range of dust leakage, basing on the refocused image and the shooting angle.

2. The device according to claim 1, characterized in that the light field camera comprises:
    main lens, used to focus and image the scene or object in one shot;
    microlens array, composed of microlenses in the form of an array, the focal length of each microlens is the same as the aperture, and the optical axes are parallel to each other;
    image sensor, used to detect incident light, photoelectrically convert it and form a digital image signal, and record the original light field image modulated by the main lens and microlens array;
    wherein, the optical axes of the main lens, the microlens array, and the image sensor, are coincident, the microlens array is located at the image plane of the main lens, the image sensor is located twice as far behind the microlens array at the focal length.

3. The device according to claim 2, characterized in that the shooting angle includes a pitch angle and a circumferential angle, and the rotation center of the 3D PTZ in the pitch direction and circumferential direction passes through the center of the microlens array.

4. The device according to claim 2, characterized in that the spatial coordinates are 3D coordinates in the right-hand coordinate system, which is established by taking the center of the image sensor as origin and the optical axis direction as X axis.

* * * * *